（12）United States Patent
Schmidt

(10) Patent No.: US 6,508,440 B2
(45) Date of Patent: Jan. 21, 2003

(54) ONE-PIECE CONDUIT HANGER

(75) Inventor: Frederick Schmidt, Frankfort, IL (US)

(73) Assignee: Beverly Manufacturing Co., Tinley Park, IL (US)

( * ) Notice: Subject to any disclaimer, the term of this patent is extended or adjusted under 35 U.S.C. 154(b) by 0 days.

(21) Appl. No.: 09/732,607

(22) Filed: Dec. 8, 2000

(65) Prior Publication Data

US 2002/0100843 A1 Aug. 1, 2002

(51) Int. Cl.[7] .................................................. F16L 3/00
(52) U.S. Cl. ......................................... 248/62; 248/68.1
(58) Field of Search .............................. 248/62, 72, 63, 248/343, 68.1, 58

(56) References Cited

U.S. PATENT DOCUMENTS

| 2,657,442 | A | * | 11/1953 | Bedford, Jr. | |
| 3,177,542 | A | * | 4/1965 | James | |
| 3,310,264 | A | | 3/1967 | Appleton | 248/72 |
| 3,441,240 | A | * | 4/1969 | Kindorf | |
| 3,532,311 | A | * | 10/1970 | Havener | |
| 4,320,882 | A | | 3/1982 | Bachle | 248/70 |
| 4,436,266 | A | | 3/1984 | Gerding | 248/74 |
| 4,479,625 | A | | 10/1984 | Martz | 248/74 |
| 4,560,126 | A | | 12/1985 | Judkins et al. | 248/72 |
| 4,618,114 | A | | 10/1986 | McFarland | 248/65 |
| 4,709,888 | A | | 12/1987 | Cubit et al. | 248/73 |
| 4,793,578 | A | | 12/1988 | Howard | 248/62 |
| D331,189 | S | | 11/1992 | Daigle et al. | D8/396 |
| 5,272,934 | A | | 12/1993 | Chegash et al. | 74/502.4 |
| 5,354,952 | A | | 10/1994 | Hickey | 174/48 |
| 5,619,263 | A | * | 4/1997 | Laughlin et al. | |
| 5,678,456 | A | | 10/1997 | Webb | 74/502.4 |
| 5,740,994 | A | | 4/1998 | Laughlin | 248/68.1 |
| 5,788,201 | A | | 8/1998 | Hardison | 248/302 |
| 5,848,770 | A | | 12/1998 | Oliver et al. | 248/58 |
| 5,921,509 | A | | 7/1999 | Flood et al. | 248/58 |
| 5,971,329 | A | | 10/1999 | Hickey | 248/68.1 |
| 6,086,029 | A | * | 7/2000 | Oliver | |

FOREIGN PATENT DOCUMENTS

DE  2538415 A1  *  3/1977

OTHER PUBLICATIONS

Halex Prior Art, Part No. 26781 for Conduit Hanger with Speed Thread.
MSC Brochure for Thomas & Betts OD Tubing Pipe Clamps, p. 3652; Thomas & Betts Metal Framing Spring Nuts, p. 3650.
Appleton Electric Company Discount Schedule CH for Rigid Metal Conduit, IMC or EMT "Hang–On" Hangers, p. 3.

* cited by examiner

Primary Examiner—Korie Chan
(74) Attorney, Agent, or Firm—Lee, Mann, Smith, McWilliam, Sweeney & Ohlson; Timothy J. Engling

(57) ABSTRACT

An inwardly flexible, one-piece conduit hanger, which is preferably U-shaped, adapted for attachment of a conduit to a channel with ledges. The hanger has substantially flat hanger halves extending from the base of the "U-shaped" member. Each hanger half preferably forms two legs thereby defining a generally U-shaped conduit recess in each half. Curved clasps on an end portion of each leg are formed on each side of the recesses. The clasps engage ledges of the channel and secure the hanger and conduit to the channel.

23 Claims, 1 Drawing Sheet

ONE-PIECE CONDUIT HANGER

BACKGROUND OF THE INVENTION

The present invention relates to a one-piece hanger adapted to secure conduit to channels with ledges or other similar overhead or vertical support structures. The conduit hanger can be mounted on a framing channel and is operable in various positions of holding and supporting a conduit when made secure, but it is primarily designed to suspend from or attach above an overhead channel secured by the ledges (extending lips or flanges) adjacent the open portion of the channel.

In the typical commercial building, air ducts, wiring, and other utilities are installed overhead and subsequently concealed by a suspended ceiling. It is generally known and a common practice in the construction and maintenance industries to support conduit such as gas, water, steam and/or compressed air carrying pipes, electrical cable conduit, and other associated plumbing and/or utility carrying conduits from a ceiling or other support structures. Dropped ceiling construction is heavily used in commercial and industrial buildings. Dropped ceiling construction requires reliable installation of electrical and other utility services above the ceiling. This is usually accomplished by means of suspension devices that are attachable to the support structure and adaptable for holding and supporting the conduit usually in substantially horizontal positions. Commonly, electrical and other utility conduits are strung above the dropped ceiling through supporting channels located beneath the next higher floor.

The installation of electrical wiring in building construction is subject to stringently enforced codes. Generally, wiring must be run in a protective conduit. Safety regulations require that electrical wires be strung safely and securely from each connection point to the next. Certain codes require that long runs of conduit that span an open space be supported at some interval, depending on the type of conduit. Various types of metal conduit must be supported at least every 10 feet, with certain exceptions. For non-metallic conduit, the maximum permissible number of feet between supports varies according to the diameter of the conduit. For example, conduit having a diameter in the range from a ½ inch to 1 inch must be supported at least every 3 feet, while conduit having a diameter of 6 inches need only be supported every 8 feet.

In the construction and maintenance industries, various types and sizes of pipes are used as conduits for electrical wiring, plumbing systems, and other utilities. Industrial, commercial and residential buildings normally require many different sizes and types of conduit that are hung or otherwise supported from some support structure at regular intervals along the length of travel of the conduit.

One type of conduit-holding means is referred to as a pipe strap or an outer diameter tubing pipe clamp as shown in FIG. 2 of U.S. Pat. No. 5,354,952. The prior art includes a three or four-piece hanger that has two mirror-image side members that attach with a T-shaped base into the ledges along the open portion of the channel. The four parts are the two side members, a bolt and a nut. A part of each side member is curved similarly to the conduit. The uppermost ends of the side members are flanges bent away from the curved parts to be generally parallel to each other when the pipe strap is holding a conduit in place, and the ends have a hole for a bolt to pass through. The ends are drawn together by tightening a bolt that forces the curved parts firmly against a conduit. An improvement has eliminated the nut wherein one of the side members has a threaded hole that is designed to fit around and secure the bolt. The T-shaped channel insertion portion of each side member is inserted into a channel and rotated to rest on the two ledges of the channel opening. Each side member is relatively thin so that it can be inserted parallel into the channel opening and turned so it is behind the channel ledges. The conduit is inserted between the side members and a bolt is tightened through holes in the ends.

Other prior art hangers use a framing spring nut, such as sold by Thomas & Betts, wherein a threaded insert with a spring is inserted into the channel opening. The threaded insert, after being inserted into a channel, rests on the two ledges of the channel opening. The spring resiliently engages the inner back wall of the channel opposite the channel opening to push the threaded insert into the ledges of the channel opening. The threaded insert is narrower than it is long so that the narrow side can be inserted parallel into the channel opening and turned so the longer side is behind the ledges. The insert is threaded so a bolt can be tightened through its aperture. A second part incised with advancing spiral threads that will secure the conduit can be screwed into the threaded insert. Such a second part used with a framing spring nut is a hanger shown in U.S. Pat. No. 3,310,264 that attaches to the spring nut with a bolt.

A similar conduit hanger, commonly referred to by electrical installers in the building trade as a minnie or Minerallac RTM, is shown in U.S. Pat. No. 4,479,625. A minnie is a generally U-shaped device formed of sheet metal and provided with a flat base that may contact the channel (or framing spring) and two arms that have a cylindrically rounded part shaped to fit against a conduit. The outer ends of the arms are relatively parallel to each other and have aligned holes to permit a bolt to pass therethrough. The dimensions of a minnie are such that there is space between the ends when the bolt is tightened to cause the arms to clamp the conduit tightly.

The central part of a channel often has a plurality of apertures spaced along it to allow other components to be bolted to the strut. A minnie or other hanger can be attached to the strut by a bolt that passes up through a flat base of the hanger in the central part and through the aperture and is held in place by a nut to form a complete conduit-holding device. The conduit-holding device may also include a washer on the bolt to prevent the nut from being drawn through the relatively large aperture of the channel. When a framing nut is used, it must come in different sizes to accommodate channels of different depths. The spring portion of the spring nut will be different for A and B series channels.

Another typical conduit supporting structure, commonly referred to as a trapeze because of its appearance, consists of at least two suspension members spaced apart from each other and extending downwardly from an overhead support structure with a conduit support bar attached at or near the lower ends thereof to be held in a horizontal position by the bar.

One of the problems with such trapeze structures is that the bars are cut to the desired length on the job and that the individual clamping devices that fit the bar and hold the conduits in place are selected and assembled with the bar and the conduits. This requires the electricians to spend time doing such cutting, selecting, and assembling of the components for each trapeze. Also, an electrician installing trapezes must have numerous components. This is an alternative to the present hanger, but often channels are already preexisting in commercial buildings or are installed for other purposes in addition to hanging conduit, such as holding the suspended ceiling.

Many prior art devices are complicated and cumbersome mechanisms that are inconvenient, awkward, and difficult to manufacture, handle and operate. These devices often require considerable assembly and manipulation to adequately secure the conduit in its supported position with a hanger assembly. The amount of labor required to form the parts and to assemble them into a conduit hanging system is often extensive.

Another drawback with prior art hangers is that they require assembly of more than one part during both the manufacture of the hanger and during installation of the conduit with the prior art hangers. The present hanger facilitates the rapid mounting of conduit on a channel without tools or additional pieces. A channel must be hung or installed for use of the present hanger, but often these are used for other purposes and often remain through subsequent remodeling of office space or industrial conversions. The present hanger can be installed on a channel simply and easily, without need for the use of special hardware or tools. The conduit hanger is structurally and operationally simple, durable, easy to install, and requires minimal manipulation to position and secure a conduit to a channel. An object of this invention is to reduce the time and labor required to hang conduit. It has therefore been found beneficial to produce a one-piece conduit hanger that can be used with only one hand.

Moreover, it would be significant in the electrical industry to provide a hanger that can slide along the channel and can be easily removed, which is not easy with the prior art hangers that have fasteners to tighten a portion of the hanger into the channel or around the conduit.

These and other objects and advantages of the invention will be apparent from the following description, the accompanying drawings and the appended claims.

SUMMARY OF THE INVENTION

The conduit hanger of the present invention overcomes the foregoing disadvantages and provides an easily manufactured, easily used, and reliable hanger suitable for supporting conduit, cable, piping or the like, especially above a dropped ceiling. Hereinafter, "conduit" is used to mean conduit, cable, piping, tubing or the like. The present invention provides a hanger that can be easily and conveniently manufactured from a single strip of deformable material.

The invention may be described as a one-piece conduit hanger that is easily manipulated by squeezing, inserting, and snapping into a channel without any other component or step. The one-piece conduct hanger does not have multiple parts that must be assembled, such as a bolt. In a preferred embodiment, the invention may be described as a U-shaped, one-piece conduit hanger, adapted for attachment of a conduit to a channel with ledges, having substantially flat hanger halves extending from the base of the "U-shaped" member. Each flat surface of each hanger half forms two legs thereby defining a generally U-shaped conduit recess in each half. Curved clasps on a distal portion of each leg are formed on each side of the recesses. The clasps are adapted to engage ledges of the channel and secure the hanger and conduit to the channel.

It is contemplated that the hanger can snap into a channel fixed on the inner portion of the ledges of the channel so that the conduit is held in place. Also, the conduit may keep the hanger from moving into the channel when it is in the conduit recess.

The present invention overcomes the need for assembly of more than one part during both the manufacture of the hanger and during installation of the conduit secured by the one-piece hanger.

BRIEF DESCRIPTION OF THE DRAWINGS

The above mentioned and other features of this invention and the manner of obtaining them will become more apparent and the invention itself will be best understood by reference to the following description of embodiments of the invention taken in conjunction with the accompanying drawing in which.

DETAILED DESCRIPTION OF THE INVENTION

While the present invention will be described fully hereinafter with reference to the accompanying drawings, in which a particular embodiment is shown, it is to be understood at the outset that persons skilled in the art may modify the invention herein described while still achieving the desired result of this invention. Accordingly, the description that follows is to be understood as a broad informative disclosure directed to persons skilled in the appropriate art and not as limitations of the present invention.

Figure 1:
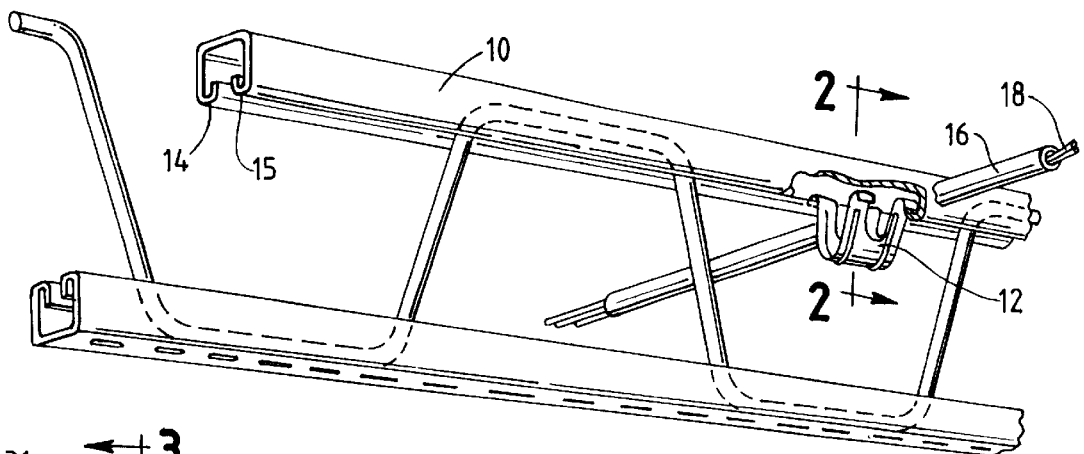
FIG. 1 is a perspective view of a combination showing metallic channels partially cut-away where a one-piece conduit hanger is attached.

In the figures, like reference numerals indicate the same elements throughout. FIG. 1 shows a metal framing channel 10 supporting a one-piece conduit hanger 12. Common metal framing channels 10 are known as Unistrut® or Superstrut® channel. For example, Unistrut® channels come in two sizes. Channel Type A is 1 ⅝th inch by 1 ⅝th inch, and Channel Type B is 1 ⅝th inch by ¹³⁄₁₆th of an inch. The distance between the inner portion of channel ledges 14 and 15 is ⅞ th of an inch for both types. A "channel" is not meant to be limited to these particular embodiments, and although shown as horizontal channels, they may be mounted vertically or otherwise.

By way of illustration, the conduit hanger 12 supports conduit 16, shown as a galvanized pipe. Although the preferred embodiment of the invention is illustrated and described in connection with these specific pipes, it can be adapted for use with a wide variety of conduit, pipe, or tubing. Conduits 16 are typically rigid tubes having annular cross sections with prescribed cross-sectional dimensions and wall thicknesses, and they may be made of a suitable metallic or non-metallic material, provided such material meets requirements of structural and chemical integrity and is sufficiently resistant to moisture, fire, and corrosive chemical atmospheres. Conduits 16 used in electrical wiring installations are produced in several standard sizes, such as an outer diameter of ¹³⁄₁₆ inch and the largest of which in general use has a 4 ½ inch outer diameter. Although rigid is preferred, conduit 16 can be flexible. Finally, the conduit 16 can be smooth, corrugated, or spiral wound.

Typically, electric wire 18 is pulled through the conduit 16, but the conduit, pipe, or tubing can be used for many purposes.

Figure 2:
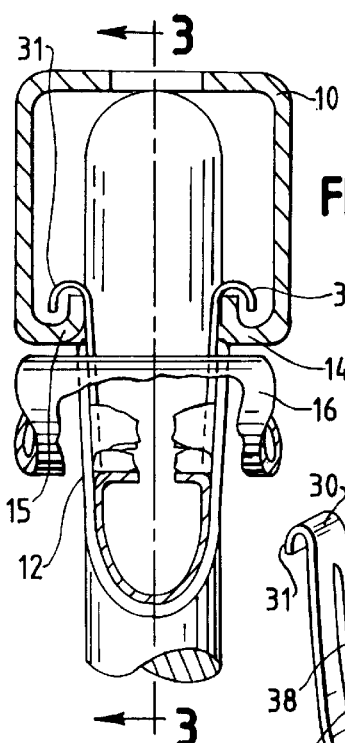
FIG. 2 is a partially cut-away section view taken along section line 2—2 of FIG. 1.
Figure 4:
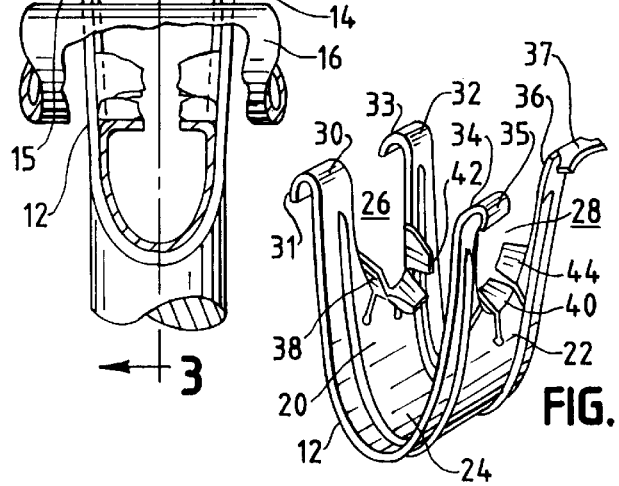
FIG. 4 is perspective view of the one-piece hanger.

A preferred one-piece conduit hanger 12 is best seen in FIG. 4. Hanger halves 20 and 22 extend from a generally U-shaped member 24. As shown in FIG. 2, the conduit hanger 12 is preferably U-shaped in its cross section. The hanger 12 is made of a deformable yet resilient material to permit squeezing of the hanger halves 20 and 22 with a return to the original shape of the hanger 12. The hanger halves 20 and 22 are joined at the base of the U-shaped member 24 that acts as the basis when pressure is applied to the hanger halves 20 and 22 to squeeze the hanger halves 20 and 22 together prior to installation in the channel 10.

Figure 3:
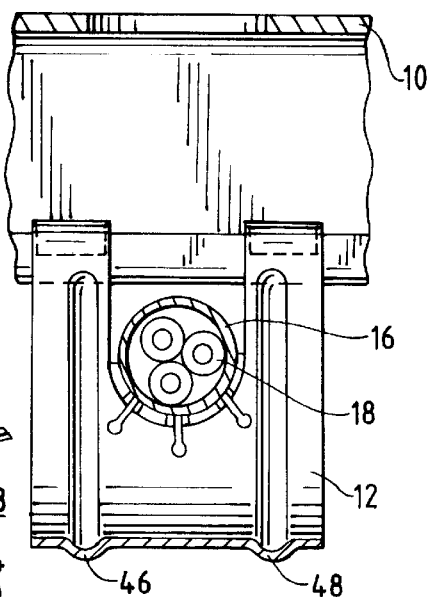
FIG. 3 is a section view taken along section line 3—3 of FIG. 2.

As shown in FIGS. 2 and 3, the conduit 16 when installed in this manner prevents the conduit hanger 12 from moving substantially into the channel 10, and complementarily, the conduit hanger 12 prevents the conduit 16 from moving away from the channel 10 and secures the conduit 16 to the channel 10. Ideally, the conduit 16 is held against the channel 10. As shown, the conduit hanger 12 can be used to secure the conduit 16 perpendicular to the channel 10, but the hanger 12 can also be used to secure the conduit 16 parallel to the channel 10 by holding the conduit 16 in the U-shaped member 24. Also, it is understood that the conduit hanger 12 can secure conduit 16 from moving away from the channel 10 when the ledges 14 and 15 are on the top of the channel 10, as if FIGS. 2 and 3 were inverted, or if the channel 10 is vertically oriented.

Conduit accommodating recesses 26 and 28 are provided in each hanger half 20 and 22 respectively. Recesses 26 and 28 are preferably arcuate. A substantially flat surface of each hanger half 20 or 22 preferably forms two legs, 30 and 32 or 34 and 36, thereby defining a space therebetween that forms the conduit accommodating recesses 26 and 28. The pair of spaced opposed legs, 30 and 32 or 34 and 36 preferably define a generally U-shaped conduit recess 26 or 28 in each hanger half 20 or 22. The legs 30 and 32 or 34 and 36 are preferably spaced parallel or substantially parallel and extending from the opposite sides of the U-shaped member 24.

Preferably, on each side of both recesses 26 and 28 are legs 30, 32, 34, and 36 with curved clasps 31, 33, 35, and 37 adapted to engage ledges 14 and 15 of the channel 10. A pair of legs, i.e., 30 and 32 or 34 and 36 are preferred on each hanger half 20 and 22 respectively. As shown in FIG. 2, each clasp 31 and 35 contacts the ledges 14 and 15 thereby supporting the hanger 12 with a conduit 16 secured to the channel 10. Two clasps, such as 31 and 37, could possibly secure the hanger 12 to the channel 10, but would not function nearly as well as four claps and would not provide as much support and strength as four legs 30, 32, 34 and 36 each having a clasp 31, 33, 35, and 37.

Clasps 31, 33, 35 and 37 can also be notched at their base and curved as shown in reference 37 of FIG. 4. Also, clasps 31, 33, 35 and 37 can be formed with a barb as shown in reference 35 of FIG. 4. These alternate embodiments more grippingly engage ledges 14 and 15 so that the conduit hanger 12 does not slide along the channel 10 as easily. This may be useful for vertically mounted channels 10.

Figure 5:
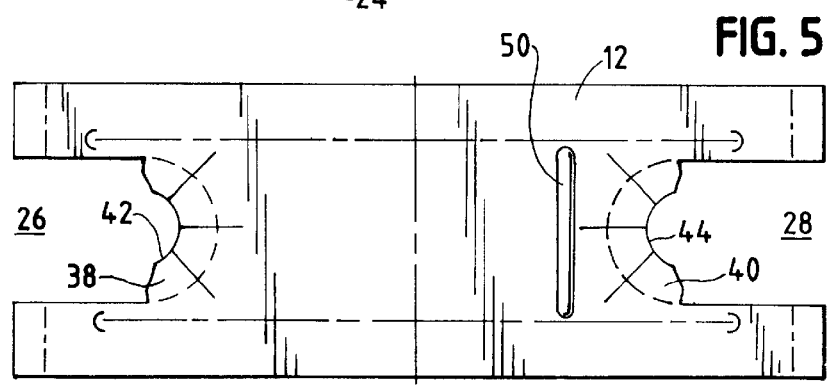
FIG. 5 is a top view of the blank of a one-piece conduit hanger before it is bent.

Preferably, a series of deformable fingers 38 and 40 extend inwardly from the respective hanger halves 20 and 22 at the base of the recesses 26 and 28. Ideally, angularly inclined inwardly, the series of fingers 38 and 40 are adapted to accommodate different sized conduit 16. The fingers 38 and 40 are capable of being deformed to hold and support conduit 16 with different outer diameters and to securely hold conduit 16 against the channel 10. The distal ends 42 and 44 form a smaller circumference than at the base of the recesses 26 and 28 to accommodate smaller conduit 16. Also, it is preferred if there is a gap between the adjacent fingers 38 or 40. The base between the fingers 38 or 40 can have a radius to make a rounded gap base. The fingers 38 and 40 can bend to accommodate conduit 16 with a larger circumference. As seen in FIG. 5, which is a top view of the blank of a one-piece conduit hanger 12 before it is bent, the fingers 38 and 40 are preferably formed from the same stamped piece of metal as the entire conduit hanger 12, however, it is possible to form the hanger 12 of plastic or other resilient materials.

Further, as best shown in FIG. 3, lateral ridges 46 and 48 can be formed sidelong in a surface of the conduit hanger 12 to add strength to the hanger 12 across its body. Ideally, the lateral ridges 46 and 48 extend onto a portion of the legs 30,32,34, and 36. A continuous lateral ridge 46 or 48 can extend across the member 24 from one leg to a leg on the opposing hanger half. A crossbar ridge 50 in a surface as shown in FIG. 5 can be added adjacent the fingers 40 to provide added strength to prevent any strain from the weight or pulling of the conduit 16. Any of these ridges can extend outward from the conduit hanger 12 or may be recessed into the conduit hanger 12.

The conduit hanger 12 is versatile and can be used with multiple types and sizes of objects. The hangers 12 are well suited for sliding along the channel 10 for slight adjustments during installation of a conduit 16. The hangers 12 are suited for either securing a conduit 16 perpendicular or parallel to the channel 10.

FIG. 5 is a top view of the blank of a one-piece conduit hanger 12 before it is bent. This drawing shows that each feature of the preferred conduit hanger 12 can be made from one continuous piece of material, preferably metal (although some types of plastic may be acceptable). The conduit hanger 12 can be formed of sheet metal, as in this embodiment, or it may be molded of a suitable non-metallic substance that meets the Code requirements, such as plastic. A stamped flat piece can be formed into a conduit hanger 12 by bending it into a generally U-shaped member 24 and by bending the ends of each leg 30, 32, 34, and 36 to form curved clasps as shown in FIG. 4 as 31, 33, 35, and 37. A plastic piece can be similarly formed or molded. Also, in a preferred embodiment a series of fingers 38 and 40 bend to extend inwardly from the respective hanger halves 20 and 22 at the base of the recesses 26 and 28. The preferred material must be rigid although flexible so that the hanger 12 will flex together when pressure is applied on the hanger halves 20 and 22.

A preferred method of installing conduit 16 using this one-piece conduit hanger 12 comprises the steps of:

locating a framing channel 10 with ledges 14 and 15 as described above;

placing a conduit 16 to be installed near the framing channel 10 either substantially parallel or substantially perpendicular to the framing channel 10;

obtaining a one-piece conduit hanger 12 having a U-shaped member 24 with two hanger halves 20 and 22, each half having a conduit accommodating recess 26 and 28, preferably forming four legs 30, 32, 34, and 36 each leg having a clasp 31, 33, 35, and 37 on each side of each recess 26 and 28;

placing the one-piece conduit hanger 12 in contact with the conduit 16 so that the U-shaped member 24 or one of the conduit accommodating recesses 26 and/or 28 engage the conduit 16;

applying pressure on the hanger halves 20 and 22 either before or after the conduit hanger 12 is placed in contact with the conduit 16 such as with the operator's hand to squeeze the hanger halves 20 and 22 together; and mounting the hanger-conduit combination by preferably inserting the four clasps 31, 33, 35, and 37 inside the ledges 14 and 15 of the channel 10 and releasing the applied pressure so that the clasps 31, 33, 35, and 37 engage the ledges 14 and 15 of the channel 10.

Two of the clasps, i.e., 31 and 33, can be placed on one of the ledges, i.e., 15, with the conduit 16 already in contact with the conduit accommodating recess 26 with applied pressure on the hanger halves 20 and 22 so that the second set of clasps 35 and 37 can be snapped into the second ledge 14 when the applied pressure is released. This method permits the easy mounting of a conduit 16 on a channel 10 that can be performed with a single piece hanger 12. Also, the second set of clasps 35 or 37 can be curved or angled to more gripping engage the ledge 14.

Removal of the conduit 16 from the hanger 12 is accomplished by squeezing the hanger halves 20 and 22 and removing the clasps 31, 33, 35, and 37 from the ledges 14 and 15 of the channel 10. The hanger 12 then no longer supports the conduit 16.

Although the preferred embodiment of the invention is illustrated and described in connection with particular features, it can be adapted for use with a variety of conduit. Other embodiments and equivalent hangers and methods are envisioned within the scope of the invention. Various features of the invention have been particularly shown and described in connection with the illustrated embodiments of the invention, however, it must be understood that these particular embodiments merely illustrate and that the invention is to be given its fullest interpretation within the terms of the appended claims.

What is claimed is:

1. A one-piece conduit hanger adapted for use with a channel including:
    a generally U-shaped base member;
    a first pair of hanger legs (30, 34) positioned at one end of said base member, each leg having a terminal end being spaced apart from a terminal end said other leg but movable both toward and away from said other leg, said first pair of legs defining a passage therebetween;
    a second pair of hanger legs (32,36) positioned at the other end of said base member and laterally spaced from said first pair of hanger legs, each of said second pair of hanger legs being spaced apart from each other but movable both toward and away from said other leg, said second pair of legs defining a passage therebetween;
    an arcuate recess formed in said base member between said first and second pairs of legs, said recess having a central axis perpendicular to the central axis of said base member; and
    an outwardly extending lip formed on said terminal end of each of said first and second legs, said lips adapted to engage an inner wall of the channel and support said hanger within said channels.

2. A one-piece conduit hanger adapted for attachment to a channel with ledges, the one-piece conduit hanger comprising:
    a generally U-shaped member having a pair of hanger halves,
    a conduit accommodating recess in each hanger half, wherein the conduit accommodating recesses in each hanger half are spaced apart from each other and a base of the U-shaped member, and
    clasps extending outwardly from the U-shaped member on a side of the recesses adapted to engage the ledges of the channel.

3. The conduit hanger of claim 2 wherein the hanger is formed from a continuous metal sheet.

4. The conduit hanger of claim 2 wherein the conduit accommodating recess in each hanger half forms a leg on each side of the generally U-shaped conduit recess.

5. A one-piece conduit hanger adapted for attachment to a channel with ledges, the one-piece conduit hanger comprising:
    a generally U-shaped member having a pair of hanger halves,
    a conduit accommodating recess in each hanger half;
    a series of fingers extending inwardly from the respective hanger halves at a base portion of the conduit accommodating recess, and
    clasps extending outwardly from the U-shaped member on a side of the recesses adapted to engage the ledges of the channel.

6. Th e conduit hanger of claim 5 wherein the fingers are resilient.

7. The conduit hanger of claim 5 wherein the fingers are angularly inclined inwardly.

8. The conduit hanger of claim 5 wherein the fingers form a circumference and distal ends of the fingers form a smaller circumference than the base portion of the conduit recess.

9. A method of installing conduit comprising the steps of:
    locating a framing channel with ledges;
    placing a conduit near the framing channel;
    obtaining a one-piece conduit hanger having two hanger halves, each half having a conduit accommodating recess, and a clasp on a side of each recess;
    placing the one-piece conduit hanger in contact with the conduit so that at least one conduit accommodating recess engages the conduit;
    applying pressure on the hanger halves to squeeze the hanger halves together; and
    mounting the hanger-conduit combination by inserting the clasps inside the ledges of the channel and releasing the applied pressure so that the clasps engage the ledges of the channel.

10. A one-piece conduit hanger adapted for attachment to a channel with ledges, the one-piece conduct hanger comprising:
    a generally U-shaped member having a pair of hanger halves and a curved base, each hanger half extending on opposite sides of the base of the U-shaped member,
    a conduit accommodating recess in each hanger half, wherein the conduit accommodating recesses in each hanger half are spaced apart from each other in a substantially flat portion of each hanger half, and
    clasps extending outwardly from the U-shaped member on a side of the recesses adapted to engage the ledges of the channel, wherein the hanger is formed from a molded non-metallic substance.

11. The conduit hanger of claim 10 wherein the clasps are notched at their base and curved for gripping engagement with the ledges.

12. A one-piece conduit hanger adapted for attachment to a channel with ledges, the one-piece conduit hanger comprising:
    a generally U-shaped member having a pair of hanger halves, a conduit accommodating recess in each hanger half; and clasps extending outwardly from the U-shaped member on a side of the recesses adapted to engage the ledges of the channel, wherein the clasps form barbs for gripping engagement with the ledges.

13. An inwardly flexible, one-piece conduit hanger adapted for attachment of a conduit to a channel with ledges, the one-piece conduit hanger comprising:

a resiliently deformable, generally U-shaped member having substantially flat hanger halves, extending from the base of the U-shaped member, each substantially flat surface of each hanger half forming two legs thereby defining a generally U-shaped conduit recess in each half adaptable to surround the conduit; a curved clasp on a distal portion of each leg adapted to engage ledges of the channel and to secure the hanger and the conduit to the channel.

14. The conduit hanger of claim 13 further including a ridge in a surface of the hanger to add structural strength.

15. The conduit hanger of claim 13 further comprising a series of fingers extending inwardly from the respective hanger halves at a base portion of the conduit recess.

16. The conduit hanger of claim 15 wherein the fingers are resilient.

17. The conduit hanger of claim 15 wherein the fingers are angularly inclined inwardly.

18. The conduit hanger of claim 15 wherein the fingers form a circumference and distal ends of the fingers form a smaller circumference than a base portion of the conduit recess.

19. The conduit hanger of claim 15 further including a crossbar ridge adjacent the fingers to add structural strength.

20. The conduit hanger of claim 13 wherein the hanger is formed from a continuous metal sheet.

21. The conduit hanger of claim 13 wherein the hanger is formed from a molded non-metallic substance.

22. The conduit hanger of claim 13 wherein the clasps are notched at their base and curved for gripping engagement with the ledges.

23. The conduit hanger of claim 13 wherein the clasps form barbs for gripping engagement with the ledges.

* * * * *